US007787488B2

(12) United States Patent
Jiang

(10) Patent No.: US 7,787,488 B2
(45) Date of Patent: Aug. 31, 2010

(54) SYSTEM AND METHOD OF OPTIMIZING THE STATIC SEGMENT SCHEDULE AND CYCLE LENGTH OF A TIME TRIGGERED COMMUNICATION PROTOCOL

(75) Inventor: Shengbing Jiang, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 1070 days.

(21) Appl. No.: 11/459,953

(22) Filed: Jul. 26, 2006

(65) Prior Publication Data
US 2007/0081548 A1    Apr. 12, 2007

Related U.S. Application Data

(60) Provisional application No. 60/725,953, filed on Oct. 12, 2005.

(51) Int. Cl.
*H04L 12/43* (2006.01)
(52) U.S. Cl. .................. 370/458; 370/431; 370/442

(58) Field of Classification Search ............. 370/431, 370/442, 458
See application file for complete search history.

(56) References Cited

U.S. PATENT DOCUMENTS

| 7,135,958 | B1 * | 11/2006 | Suuronen et al. | 340/5.62 |
| 2002/0027894 | A1 * | 3/2002 | Arrakoski et al. | 370/338 |
| 2004/0081193 | A1 * | 4/2004 | Forest et al. | 370/458 |
| 2005/0025182 | A1 * | 2/2005 | Nazari | 370/469 |

OTHER PUBLICATIONS

Arne Hamann, "TDMA Time Slot and Turn Optimization with Evolutionary Search Techniques", Mar. 2005, IEEE, pp. 312-317 vol. 1.*

\* cited by examiner

*Primary Examiner*—William Trost, IV
*Assistant Examiner*—Siming Liu

(57) ABSTRACT

An internal communication system adapted for communicatively coupling a plurality of nodes during a cycle, wherein the cycle presents a cycle length and a plurality of static temporal slots. The system includes at least one communication channel, and an electronic control unit configured to optimize a schedule of time-triggered internodal messages, and the cycle length.

11 Claims, 3 Drawing Sheets

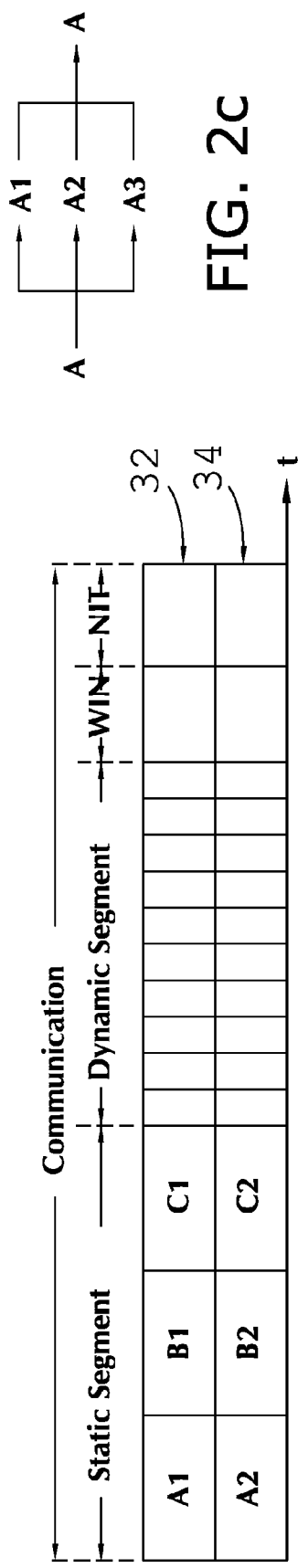
FIG. 4a
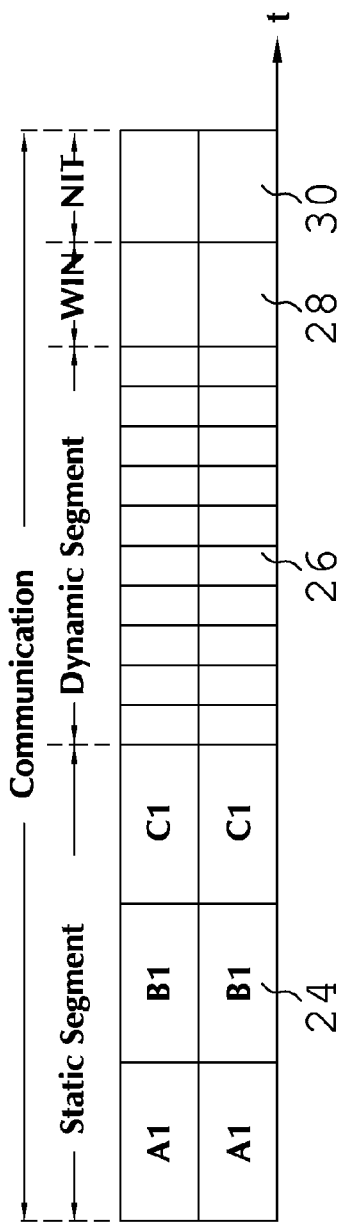
FIG. 2c
FIG. 4b
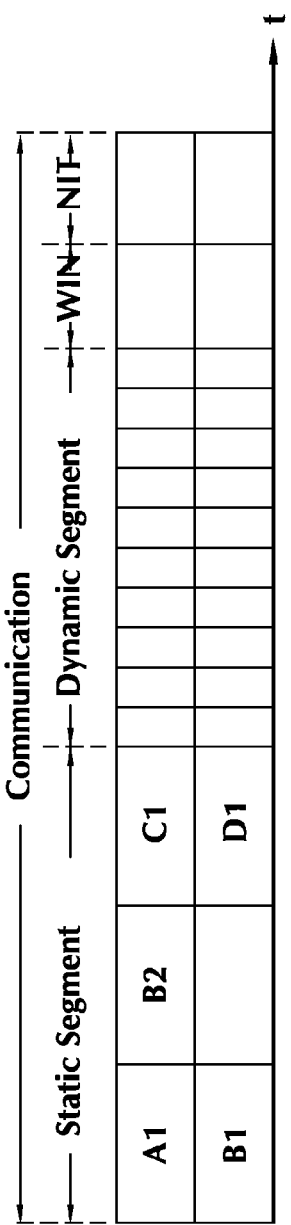
FIG. 4c

SYSTEM AND METHOD OF OPTIMIZING THE STATIC SEGMENT SCHEDULE AND CYCLE LENGTH OF A TIME TRIGGERED COMMUNICATION PROTOCOL

CROSS-REFERENCES TO RELATED APPLICATIONS

This U.S. Non-Provisional patent application claims the benefit of pending U.S. Provisional application Ser. No. 60/725,953 filed on Oct. 12, 2005.

BACKGROUND OF THE INVENTION

1. Field of the Invention

The present invention relates to internal time-triggered communication systems, and more particularly to a system configured to optimize the static segment schedule and cycle length of a time-triggered communication protocol having homogeneous slot sizes.

2. Discussion of Prior Art

Internal communication protocols have been developed to enable electronic inter-nodal communication and function in various applications. Conventional protocols and networking standards, such as Local Interconnect Networks (LIN), Media Oriented System Transport (MOST), and Controller Area Network (CAN) systems control electrical communication between the various nodes and a host controller.

In the vehicle manufacturing industry, protocols support the instrument panels, clusters and other electrical devices of vehicles, such as automobiles, aircrafts, recreational vehicles, and boats. For example, electromechanical power-assisted steering and anti-lock brakes may rely upon a communication network and protocol to receive electric signals from a controller that communicates with various speed and control sensors. As functionality and amenities, such as entertainment and computer systems, become increasingly inclusive, and driven by electromechanical and electro-software means, the necessary capacity, flexibility, and reliability of these protocols and network systems become increasingly critical for proper and safe operation. The introduction of advanced control systems that often combine multiple sensors, actuators and electronic control units also place boundary demands on conventional communication systems.

As a result, one type of communication system, the FlexRay™ communications protocol ("FlexRay"), has been developed for increasing the bandwidth, determinism, flexibility, scalability, and fault-tolerance of electronic communication systems. In contrast to conventional event-triggered automotive protocols, FlexRay, in this setting, combines time-triggered and event-triggered aspects to form a more robust system. More particularly, the FlexRay protocol presents a multi-channeled communications medium, wherein each channel includes static and dynamic segments during a communication cycle. A plurality of time-divisible-multiple-access (TDMA) slots of homogenous duration comprises the static segment and re-occurs each cycle. The TDMA slots are manually sized prior to automation, and each slot is randomly allocated to a node connected to the system, so that the node is able to constantly, and without collision, communicate with the network. The remaining bandwidth includes a dynamic segment divided into a plurality of mini-slots, wherein each mini-slot is configured to receive an event-triggered message, such as diagnosis data, of variable size.

The FlexRay protocol, however, presents a one-size-fits all application that limits performance. Once implemented, the slots-to-node assignments remain the same for each communication cycle. Of further concern, each signal from a node is randomly assigned to a slot in the set of slots assigned to the node, and each node operates autonomously, i.e. without scheduling or coordination, with respect to the other nodes. As such, static segment utility is reduced, where a more efficient schedule is available. Another concern is presented by the constant temporal dimension of the communication cycle length, where it is appreciated that excessively large cycle lengths waste bandwidth, and may thereby cause undue delays in the network, while cycle lengths consistently too small to handle the communication load result in excessive time-triggered backlog.

Thus, to further effect the intended benefits of the FlexRay protocol, there is a need in the art for an improved and flexible time-triggered communication system that can structurally adjust, so as to more efficiently transmit a given set of messages.

BRIEF SUMMARY OF THE INVENTION

Responsive to these and other concerns associated with conventional communications protocols and networks, the present invention concerns an improved system that is useful, among other things, for optimizing the static segment schedule and cycle length of a time-triggered protocol.

More particularly, the present invention concerns an internal communication system adapted for communicatively coupling a plurality of nodes during a cycle, and optimizing a schedule of inter-nodal signals and the cycle length. The system includes at least one host ECU, and a first channel interconnecting the nodes and ECU. The ECU and first channel are cooperatively configured to transmit a plurality of time-triggered signals to and from at least a portion of the nodes within a plurality of static slots, wherein each node is individually assigned to at least one slot, during the cycle. The ECU is further configured to autonomously determine an optimal schedule for transmitting the plurality of signals within the plurality of slots, and an optimal cycle length, wherein the number of unused slots is maximized. Finally, an ECU adapted for interconnection with and configured to effect the intended benefits of the aforementioned system when connected thereto is also claimed as a subassembly.

It will be understood and appreciated that the present invention provides a number of advantages over the prior art, including, for example, providing an improved communications system that autonomously optimizes the static segment schedule for transmitting a set of messages. As a result, excessive backlog and bandwidth waste are minimized, making the invention better suited to handle traffic in increasingly complex electrical networks.

Other aspects and advantages of the present invention will be apparent from the following detailed description of the preferred embodiment(s) and the accompanying drawing figures.

BRIEF DESCRIPTION OF THE SEVERAL VIEWS OF THE DRAWING

A preferred embodiment(s) of the invention is described in detail below with reference to the attached drawing figures, wherein:

FIG. 2c is a schematic diagram illustrating a fragmentization and defragmentization procedure;

FIG. 4a is a block diagram of a communication cycle, particularly illustrating a unison multi-channel cycle;

FIG. 4b is a block diagram of a communication cycle, particularly illustrating a combined redundant multi-channel cycle;

FIG. 4c is a block diagram of a communication cycle, particularly illustrating a mixed connectivity multi-channel cycle.

DETAILED DESCRIPTION OF THE INVENTION

Figure 1:
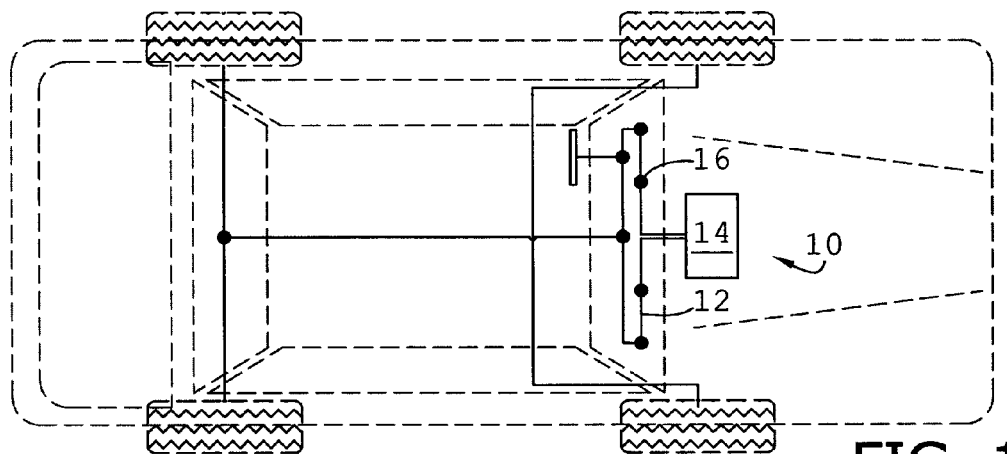
FIG. 1 is a schematic view of a preferred embodiment of the system adapted for use in a vehicle.

The present invention concerns an improved communication system that optimizes the static segment schedule and cycle length of a time-triggered communication cycle. A preferred embodiment of the system 10 is shown in FIG. 1, and described herein with respect to a FlexRay™ protocol and communications network. However, it is appreciated that the novel aspects and function of the present invention can be utilized with any time-triggered communications scheduler that utilizes a plurality of static slots. It is further appreciated that the method and algorithms described herein present only a preferred embodiment of the invention, and that modifications within the ambit of the invention can be made to modify system performance. For example, one of a plurality of inputted variables and/or constants could be added to the algorithm described herein, to provide added safety or accommodate user-preference.

I. General System Configuration:

Turning to FIG. 1, the system 10 includes a communication bus 12. Although depicted as a singular bus system, it is within the ambit of the invention to utilize the invention with a FlexRay system having a twisted pair, multi-bus, star, or other communication configuration. The bus 12 communicatively interconnects a host electronic control unit (ECU) 14, and a plurality of nodes 16 that represent various electro-mechanical components, so as to form a network. For example, in an automobile, the nodes 16 may represent a GPS and map system, a steer-by-wire system, a brake-by-wire system, a fully functional entertainment system, and an instrument cluster, each having its own ECU. The physical transport layer of the bus 12 may be electrical, optical, wireless or a combination of domains, with the understanding that message conversion is necessary before transitioning from one domain to another.

Figure 2A:
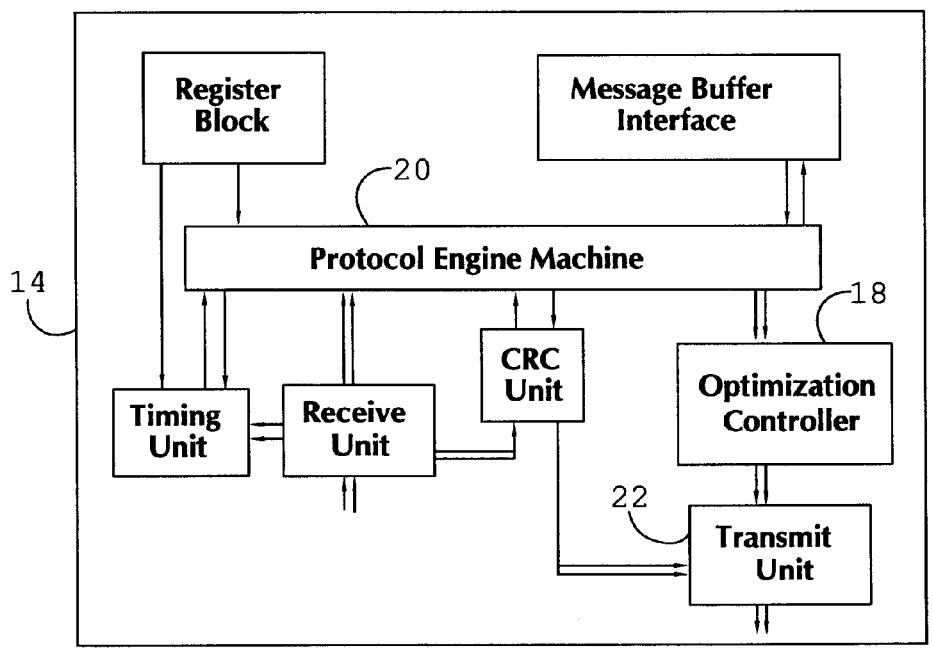
FIG. 2a is a block diagram of an ECU in accordance with a preferred embodiment of the invention.

As shown in FIG. 2a, the ECU 14 includes novel optimization means, and more preferably includes a separate optimization controller 18 communicatively coupled to a time-triggered protocol engine machine 20 that will be further discussed herein. Most preferably, the optimization controller 18 is removably connected to the ECU 14, and configured to be able to retrofit an existing communication system. For example, a portable device (not shown), such as a lap-top computer, may present the controller 18, and be configured to removably connect to an existing system, so as to provide an off-line determination of the optimal static segment schedule and communication cycle length of a given system. It is appreciated by those ordinarily skilled in the art that determining the optimal schedule and length off-line facilitates clock synchronization among nodes. Alternatively, however, where a more integrated method of continually determining the optimal schedule and cycle length is desired, e.g. where the number of communicating nodes and their message sizes vary, the controller 18 is preferably fixed to the ECU 14, and functions as a permanent part of the system 10.

Figure 2B:
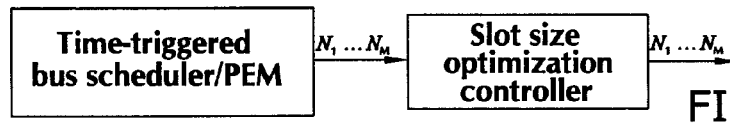
FIG. 2b is a flow diagram of the present invention, particularly illustrating an optimization controller and defragmentization procedure.

As generally shown in FIGS. 2a and 2b, the controller 18 is configured to receive at a given time, $t_o$, a plurality of M messages from the protocol engine machine 20, optimize the static segment schedule and slot length of the communication protocol according to the received messages, and then deliver the messages to a transmit unit 22 for further dissemination. As later described, the messages may be fragmented into smaller signals, $s_1 \ldots s_x$, and then reconstituted, in order to facilitate optimization (FIG. 2c). The preferred ECU 14 also includes a bus guardian configured to verify the authenticity and propriety of the messages prior to optimization. A suitable bus guardian is readily selectable by one of ordinary skill in the art without further invention or undue experimentation, and as such is not further described herein.

Figure 3:
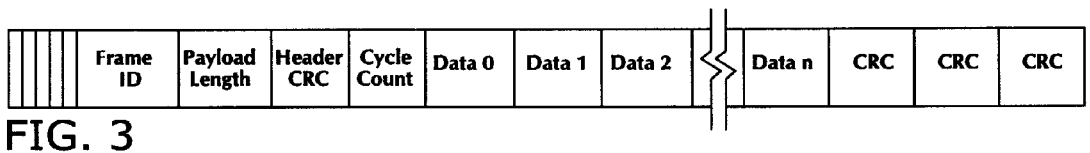
FIG. 3 is a block diagram of a FlexRay frame format.

Within a FlexRay™ protocol system, messages are received from and delivered to the slots in the frame format shown in FIG. 3. A header segment begins the data stream, and consists of various indicators and subframes, including a "Frame ID" subframe that typically presents 5 Bytes of overhead data. The Frame ID subframe is utilized to numerically sort and match the message with an allocated slot. A payload segment follows the header segment, and presents the actual message data. The payload segment may range in size from 0 to 254 Bytes depending upon the message. Finally, a trailer segment, containing three 8-bit cyclic redundancy checks (CRC's), primarily functions to detect errors. Thus, within a FlexRay™ protocol, the total message (or frame) size can range from 8 to 262 Bytes.

As shown in FIGS. 4a-c, a static segment 24 begins each communication cycle and presents a plurality of static slots. The static segment is followed by a dynamic segment 26, a symbol window time slot 28 that presents an un-arbitrated single-message slot for application use, and a network idle time slot 30 that allows computing time corrections and nodal housekeeping. More preferably, a plurality of static segment slots at least equal to the greatest number of potentially communicating nodes, and most preferably, a variable plurality of static slots is presented, so as to enable the controller 18 to optimize the number of slots, and thereby allocate greater or lesser bandwidth to the dynamic segment.

In FIGS. 4a -c, three multi-channeled communication cycles are shown over a given time period. Each multi-channel system presents temporally congruent slots and reflects one of three modes of communication that illustrate the current flexibility in the FlexRay™ protocol. First, the channels 32,34 may act in unison to form a single-channel system, wherein the data throughput is effectively multiplied by the number of channels per slot (see, FIG. 4a ). In safety critical applications, the channels may also act as a combined multi-channel system, wherein nodes connected to each channel can be configured to transmit data redundantly on each channel at the same time (see, FIG. 4b). Finally, the system 10 may reflect a multi-channel system with mixed connectivity, wherein some nodes connect to each channel, and some connect only to one (see, FIG. 4c).

II. Optimization Parameters and Constraints

Turning to the configuration of the inventive optimization algorithm, the system 10 is configured to perform the optimization utilizing various parameters and performance characteristics of the messages and the FlexRay network. More preferably, for a plurality of messages, the system 10 is configured to determine the length of the communication cycle in microseconds (gdCycle), the number of static slots in the static segment (gNumberOfStaticSlots), the payload length of a static frame for the static slot in the number of 2-byte words (gPayloadLengthStatic), the duration of a static slot in the number of macroticks (gdStaticSlot), the duration of a nominal macrotick in microseconds (gdMacrotick), and the duration of a static slot in microseconds (LengthStaticSlot), which is equal to the product of gdStaticSlot and gdMacrotick.

In a preferred embodiment of the invention, gPayloadLengthStatic, gdStaticSlot, and gdMacrotick are pre-determined and established by the FlexRay protocol. The value of the parameter gNumberOfStaticSlots depends on the length of the static segment and the size of the static slot, whereas the length of the static segment depends on the length of the communication cycle.

The controller 18 identifies a plurality of N active nodes 16 that are interconnected by the FlexRay bus 12. For a given cycle, each node i presents a number ($n_i$) of messages or signals $\{s_{ij}|j=1, \ldots, n_i\}$ attributed thereto. For each signal $s_{ij}$, $1 \leq i \leq N$, $1 \leq j \leq n_i$, the system 10 is further configured to determine additional parameters related to scheduling. These scheduling parameters include the size of each signal $s_{ij}$ in bytes ($size_{ij}$), the period of the signal $s_{ij}$ in microseconds ($T_{ij}$), and the transmission window of each signal $s_{ij}$ ($ws_{ij}$, $we_{ij}$) which specifies the time window within which the transmission of $s_{ij}$ shall be scheduled, where $ws_{ij}$ is the start time of the window, $we_{ij}$ is the end time of the window, such that $0 \leq ws_{ij} \leq we_{ij} \leq T_{ij}$.

Figure 5:
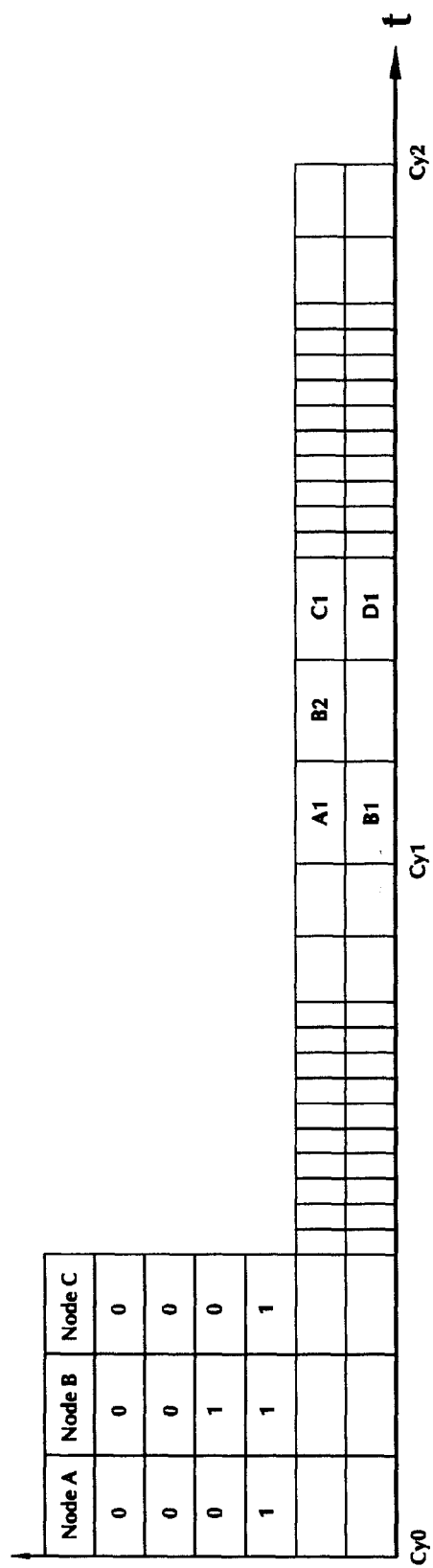
FIG. 5 is a temporal block diagram of a preferred embodiment of the present invention, particularly illustrating the slot-cycle range values of nodal contribution signals, shown with respect to FIG. 4c.

Since it is appreciated that a signal with a length longer than the payload length of a static frame can be divided into several shorter new signals at the sender side by fragmentation, the size of every signal in a two channel system is less than or equal to the payload size of a static frame, i.e., $size_{ij} \leq 2*$ gPayloadLengthStatic for all i and j (see FIGS. 2b and 5). The new signals have the same period and transmission window as the original parent signal. To reconstruct the original signal from the set of new signals, defragmentation is performed at the receiver side.

The algorithm is further configured so that all signals have a common period, i.e., $T_{ij}=T$ for all i and j. That is to say, where signals have different periods, the preferred controller 18 sets a common period for each signal equal to the least common multiple of the periods. Every invocation of each signal within the interval is treated as a new signal, and all of the new signals have an identical period that is equal to the least common multiple of the periods of all old signals. For example, in a set of three signals having differing periods of four, six, and three microseconds, the common period may be set at twelve microseconds.

In determining the optimal communication cycle length, gdCycle may initially be set to the value of T, subject to the maximum available length established by the FlexRay protocol, i.e. 16 milliseconds. More preferably, however, the length of the communication cycle is a factor of the common period, i.e., $T=n_{cc}*$gdCycle with $n_{cc} \geq 1$ being a positive integer.

Thus, in the preferred embodiment, there is a set of candidate values for the parameters gdCycle and gNumberOfStaticSlots, which is represented as $\{(gdCycle_r, gNumberOfStaticSlots_r), r=1, \ldots, R\}$. As more particularly described in parts (III) and (IV), the controller 18 is configured to optimize the values for gdCycle and gNumberOfStaticSlots from the candidate set such that the number of static slots that are not used during a cycle is maximized. That is to say, a minimal number of slots for the given messages are utilized, and as many as possible number of slots are saved for the future.

More preferably, the controller 18 is configured to initially determine the optimal schedule with given FlexRay parameters, i.e., with known values for the FlexRay parameters. The initial solution is determined by assigning the slots to nodes and signals in accordance with three requirements. First, each slot is assigned to at most one node (R1). Second, each signal is scheduled within its transmission window (R2), and third, the total size of all signals that are assigned to the same slot in a communication cycle is less than or equal to the payload size of a static frame (R3). Finally, the number of unused slots is maximized, by modeling and resolving the problem utilizing suitable conventional methodology.

III. Scheduling With Known FlexRay Parameters

For example, the scheduling problem may be modeled as a multiple-choice integer program (MCIP) problem, and many optimization algorithms can be utilized to solve the MCIP problem, wherein gdCycle is the communication cycle length with $T=n_{cc}*$gdCycle, $n_{cc} \geq 1$. The static segment is the first portion of the communication cycle in microseconds defined by gNumberOfStaticSlots*LengthStaticSlot.

Based on the transmission window [$ws_{ij}$, $we_{ij}$] of each signal $s_{ij}$, the slot-cycle range ($scr_{(ij)}$) for the signal, which represents the transmission window in terms of the cycle number and the slot number within one signal period, is determined such that $scr_{(ij)}=\{(k, h)|1 \leq k \leq$gNumberOfStaticSlots, $1 \leq h \leq n_{cc}$, and (k, h) satisfies formulas 1 and 2:

$$(h-1)*gdCycle+(k-1)*LengthStaticSlot \geq ws_{ij} \quad (1)$$

$$(h-1)*gdCycle+k*LengthStaticSlot \leq we_{ij} \quad (2).$$

The slot-cycle assignment for each signal is encoded using 0-1 variables $x_{(i,j,k,h)}$, wherein:

$x_{(i,j,k,h)}=$(1, signal $s_{ij}$ is scheduled to slot k of cycle h)
0, otherwise and, $i=1, \ldots, N; j=1, \ldots, n_i; k=1, \ldots$, gNumberOfStaticSlots; $h=1, \ldots, n_{cc}$.

From requirements R1-3, the following constraints for $x_{(i,j,k,h)}$ are provided. First, since each slot is assigned to at most one node, the sum of slot-cycle values for all combinations of differing nodal signals for any given slot is not greater than one (i.e. $x_{(i1,j1,k,h1)}+x_{(i2,j2,k,h2)} \leq 1$, for all $i_1 \neq i_2$). Second, each signal is scheduled within its transmission window, so that $$\sum_{(k,h) \in scr(i,j)} x(i, j, k, h) = 1,$$

and $x_{(i,j,k,h)}=0$, $\forall (k, h) \in scr_{(ij)}$. Finally, from requirement R3, it follows that:

$$\sum_{j=1}^{ni} x(i, j, k, h) * size_{ij} \leq 2 * gPayloadLengthStatic.$$

Given these constraints, the preferred controller 18 is configured to maximize the number of unused slots as a function of the slot-cycle signal value under either of two scenarios. First, the number of slots that are not assigned to any nodes within a common period T may be determined. Second, the number of slots that are not assigned to any signals within a communication cycle may be determined. It is appreciated that the first scenario is related to the number of new nodes that can be added to the system, while the second is related to the number of new bus signals that can be added to the system. The preferred function for determining the optimal number of unused slots under either scenario is defined as:

$$f(x) = w_1 * \sum_{k=1}^{gNumberOfStaticSlots} \max\left(0, 1 - \sum_{(i,j,h)} x_{(i,j,k,h)}\right) + \\ w_2 * \sum_{k=1}^{gNumberOfStaticSlots} \sum_{h=1}^{n_{cc}} \max\left(0, 1 - \sum_{(i,j)} x_{(i,j,k,h)}\right) \quad (3)$$

where $w_1$ and $w_2$ are pre-determined weight factors, $w_1+w_2=1, 0 \leq w_1, w_2 \leq 1$.

The scheduling problem is preferably modeled as an MCIP problem with non-linear cost function:

$$\text{maximize } f(x) \quad (4)$$

subject to the previously determined relationships:

$$x_{(i1,j1,k,h1)} + x_{(i2,j2,k,h2)} \leq 1, \text{ for all } i_1 \neq i_2$$

$$\sum_{j=1}^{ni} x_{(i,j,k,h)} * size_{ij} \leq 2 * gPayloadLengthStatic$$

$$\sum_{(k,h) \in scr_{(i,j)}} x_{(i,j,k,h)} = 1$$

$$x_{(i,j,k,h)} = 0, \forall (k, h) \notin scr_{(i,j)}$$

$$x_{(i,j,k,h)} \in \{0, 1\}$$

with the understanding that other suitable methods may be utilized.

Thus, a preferred algorithm (1) for the bus scheduling of a plurality of signals with known FlexRay™ parameters is described as follows:
1. Derive the slot-cycle range $scr_{(ij)}$ for each signal $s_{ij}$ based on the signal transmission window [$ws_{ij}, we_{ij}$];
2. Encode the scheduling decisions by assigning 0-1 values for variables $x_{(i,j,k,h)}$;
3. Capture the scheduling requirements R1 through R3 in terms of the variables $x_{(i,j,k,h)}$;
4. Model the scheduling problem as an MCIP problem with nonlinear cost function (3), and solve the MCIP problem.

It is appreciated that for the given FlexRay™ parameters there may not exist a feasible schedule that satisfies the requirements R1 through R3. In this instance, the preferred controller 18 is further configured to terminate the optimization process for the given cycle, and restart upon the commencement of a new cycle having a different signal set. Otherwise, an optimal schedule encoded by $x_{(i,j,k,h)}$ is derived.

IV. Optimal Length Selection For The Communication Cycle

Once the schedule(s) is determined for known parameters, the controller 18 is configured to dynamically determine the optimal values for the parameters gdCycle and gNumberOfStaticSlots that satisfy requirements R1 through R3. The optimal values are selected from the CycleSet={(gdCycle$_r$, gNumberOfStaticSlots$_r$), r=1,...,R } such that the number of static slots that are not used is maximized. Due to the limited extent of gdCycle, an exhaustive search is preferably utilized to obtain the values that yield the desired outcome.

Thus, from the known parameters solution, an exhaustive search based algorithm (2) for the dynamically determined optimal communication cycle length is preferably derived as follows:
1. For each (gdCycle$_r$, gNumberOfStaticSlots$_r$) in the CycleSet, Algorithm 1 is performed. If the system is schedulable for (gdCycle$_r$, gNumberOfStaticSlots$_r$), then the optimal value of the cost function is denoted by $f^*_r$.
2. Next, select the schedulable pair (i.e. gdCycle$_r$, gNumberOfStaticSlots$_r$) having the maximal $f^*_r$ value as the optimal solution, and return the corresponding bus schedule.

The preferred forms of the invention described above are to be used as illustration only, and should not be utilized in a limiting sense in interpreting the scope of the present invention. Obvious modifications to the exemplary embodiments and modes of operation, as set forth herein, could be readily made by those skilled in the art without departing from the spirit of the present invention. The inventor hereby state his intent to rely on the Doctrine of Equivalents to determine and assess the reasonably fair scope of the present invention as pertains to any system not materially departing from but outside the literal scope of the invention as set forth in the following claims.

What is claimed is:

1. An internal communication system adapted for communicatively coupling a plurality of nodes during a cycle, wherein the cycle presents a cycle length and a plurality of static temporal slots, and optimizing a schedule of time-triggered internodal messages and the cycle length, said system comprising:
   at least one host electronic-control-unit (ECU); and
   at least one channel communicatively interconnecting the nodes and ECU, said ECU and channel being cooperatively configured to transmit the messages to and from at least a portion of the nodes within the static slots, wherein each node is individually assigned to at least one slot, during the cycle, and a static segment, and number of unused slots is presented,
   said ECU being programmably configured to autonomously determine an optimal schedule for transmitting the plurality of messages within the static slots, and an optimal cycle length, wherein the number of unused slots is maximized,
   said ECU being further configured to fragment at least a portion of the messages into a plurality of signals prior to optimization, and defragment the signals, so as to reconstitute the original messages after optimization,
   said ECU being further configured to determine for each signal ($s_{ij}$) an originating node, a size in bytes, a period in microseconds ($T_{ij}$), and a transmission window, including start and end times ($ws_{ij}$, $we_{ij}$), such that $0 \leq ws_{ij} \leq we_{ij} \leq T_{ij}$, wherein i represents the node number and j represents the signal number.

2. The system as claimed in claim 1, wherein based on the transmission window [$ws_{ij}$, $we_{ij}$] of each signal ($s_{ij}$), a slot-cycle range ($scr_{(ij)}$) for the signal is determined such that $scr_{(ij)}=\{(k, h) | 1 \leq k \leq gNumberOfStaticSlots, 1 \leq h \leq n_{cc}$, and (k, h) satisfies the following formulas:

$(h-1)*gdCycle+(k-1)*$ LengthStaticSlot$\geq ws_{ij}$, and $(h-1)*gdCycle+k*$ LengthStaticSlot$\leq we_{ij}$.

3. The system as claimed in claim 2, wherein the slot-cycle assignment for each signal is encoded using integers 0 and 1, the number 1 indicates that signal ($s_{ij}$), is scheduled for the particular slot and cycle, and the sum of slot-cycle values for all combinations of differing nodal signals for any given slot is not greater than 1.

4. The system as claimed in claim 1, said ECU being further configured to determine a common period, T, equal to the least common multiple of a plurality of differing periods $T_{ij}$.

5. The system as claimed in claim 4, said ECU being further configured to determine the length of the communication cycle in microseconds (gdCycle), the number of static slots in the static segment (gNumberOjStaticSlots), the payload length of a static frame for the static slot (gPayloadLengthStatic), the duration of a static slot in the number of macroticks (gdStaticSlot), the duration of a nominal macrotick in microseconds (gdMacrotick), and the duration of a static slot in microseconds (LengthStaticSlot), wherein the LengthStaticSlot is equal to the product of gdStaticSlot and gdMacrotick.

6. The system as claimed in claim 5, wherein the length of the communication cycle in microseconds (gdCycle) is a factor of the common period T.

7. The system as claimed in claim 5, wherein gPayloadLengthStatic, gdStaticSlot, and gdMacrotick are predetermined prior to receipt of the messages.

8. The system as claimed in claim 5, wherein optimal values for gdCycle, and gNumberOfStaticSlots are determined from a predetermined set of available combinations based on the period and/or communication cycle length.

9. The system as claimed in claim 5, wherein the optimal schedule and cycle length are determined according to a plurality of requirements, including that each slot is assigned to at most one node, each signal is scheduled within its transmission window, and the total size of all signals that are assigned to the same slot in a communication cycle is less than or equal to the payload size of a static frame.

10. The system as claimed in claim 9, said schedule and cycle length being determined by modeling the system as a multiple choice integer program (MCIP) problem.

11. The system as claimed in claim 9, said ECU being further configured to terminate the determination of the optimal schedule and length for a given set of signals, when the requirements are not able to be met, and reinitiated upon receipt of a second plurality of messages.

\* \* \* \* \*